Figure 1:
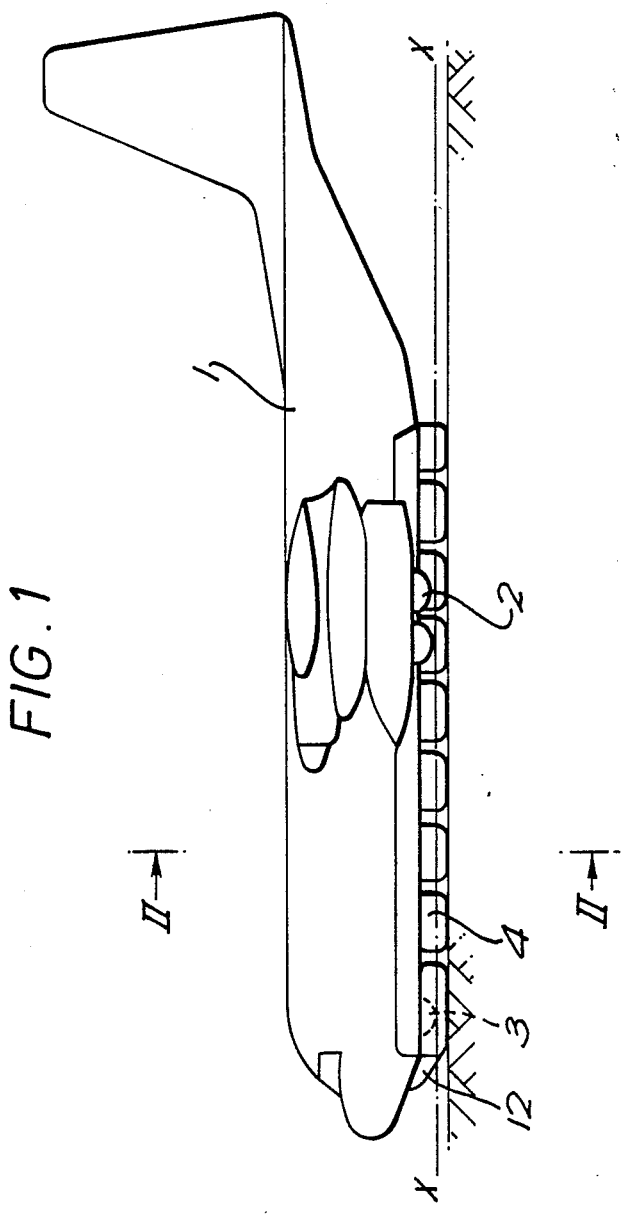

United States Patent [19]

Broadhurst

[11] Patent Number: 4,923,145

[45] Date of Patent: May 8, 1990

[54] AIRCRAFT LANDING EQUIPMENT

[75] Inventor: Jeffrey C. Broadhurst, Burton-on-Trent, United Kingdom

[73] Assignee: Woodville Polymer Engineering Limited, Ross-on-Wye, England

[21] Appl. No.: 195,679

[22] Filed: May 11, 1988

[30] Foreign Application Priority Data

May 14, 1987 [GB] United Kingdom ................ 8711352

[51] Int. Cl.⁵ .............................................. B64C 25/54
[52] U.S. Cl. .............................. 244/100 A; 244/100 R; 244/107
[58] Field of Search ................ 244/100 A, 107, 100 R, 244/110 A, 110 R; 180/119, 124, 127

[56] References Cited

U.S. PATENT DOCUMENTS

| | | |
|---|---|---|
| 2,711,868 | 6/1955 | Parker et al. ...................... 244/107 |
| 3,595,336 | 7/1971 | Perez ............................. 244/100 A |
| 3,631,938 | 1/1972 | Eggington ......................... 180/124 |
| 3,677,360 | 7/1972 | Digges ............................ 180/124 |
| 3,790,110 | 2/1974 | Earl ............................. 244/110 H |
| 4,004,761 | 1/1977 | McAvoy .......................... 244/100 A |
| 4,019,698 | 4/1977 | Earl ............................ 244/100 A |
| 4,382,567 | 5/1983 | Fredericks et al. ................. 244/107 |
| 4,697,767 | 10/1987 | Arney ........................... 244/100 A |

FOREIGN PATENT DOCUMENTS 2826619 12/1979 Fed. Rep. of Germany ... 244/100 A

OTHER PUBLICATIONS

L'Ae'ronautique el l'Astronautique, No. 39, 1-1973, pp. 107-108.

Primary Examiner—Sherman D. Basinger
Assistant Examiner—Anne Sartelle
Attorney, Agent, or Firm—Young & Thompson

[57] ABSTRACT

Auxiliary landing equipment for aircraft which comprises a plurality of inflatable cushions arranged in a predetermined array relative to each other and structure for securing them to the aircraft so that, in an inflated state, the cushions can contact the ground during landing or on take-off and so that, in a deflated state, the equipment can closely follow the contour of the aircraft part to which it is attached.

7 Claims, 3 Drawing Sheets

AIRCRAFT LANDING EQUIPMENT

This invention relates to aircraft landing equipment and more particularly to auxiliary landing equipment for use in place of the normal landing gear of the aircraft when the latter is disabled or the terrain is unsuitable for its use either during landing or on take-off.

There are many instances, for example when an aircraft is bound for destinations which are unfamiliar to the pilot or whose terrain is known to be relatively unsuitable for landing, in which the normal landing gear of the aircraft might be unsuitable for use or, if used, may be damaged. Equally, in other instances, there may have been actual damage to an aircraft's landing gear, thereby preventing reuse on take-off or on subsequent landing. In all such instances, there is a need for auxiliary landing equipment which can be utilised in place of the unsuitable or damaged normal landing gear.

The present invention provides such auxiliary landing equipment for use in such instances.

In accordance with the invention, there is provided auxiliary landing equipment for aircraft which comprises a plurality of inflatable cushions, means for arranging the cushions in a predetermined array relative to each other and means for securing them to the aircraft.

For a variety of reasons including the nature and size of the aircraft, there may be one or more pieces of equipment attached to the aircraft. Generally, the equipment will be fixed to the underside of the aircraft, normally to the fuselage but possibly also to the wings; preferably the equipment extends substantially along the whole of the lowermost surface of the fuselage in particular.

It is preferred that the cushions are attached to a support structure which is itself attached directly or indirectly to the aircraft. The support structure advantageously possesses means for attaching the cushions to it in the desired array and also, preferably, means for stabilising the cushions relaive to the aircraft.

The cushions themselves, and any associated support structure, must be such that the auxiliary landing equipment as a whole can, in a non-operational mode, be collapsed so that, in use, it can closely follow the contour of the aircraft part, normally the fuselage, to which it is attached. In an operational mode, the auxiliary equipment is preferably inflatable to a degree which allows the lowermost, i.e. landing, surface to project slightly below the maximum projection of the normal landing gear.

In preferred embodiments, at least some of the cushions may comprise a number of individual cushion "cells" interconnected by air passageways. Advantageously these are arranged in a vertical tier with adjacent surfaces being bonded together to form internal webs. Equipment in which such vertical tiers are disposed in a rectangular array with the top cell of each tier connected to a flexible support structure and the lower surface of the bottom cell provides the landing surface for the equipment is especially preferred.

Means are generally required to hold the cushions in the predetermined array during use. This can take the form of membranes interconnecting at least some of the cushions (or cushion cells in a tiered arrangement). Such membranes will aid the lateral position of the cushions relative to each other in particular.

Furthermore, it is preferred that a supporting structure for the cushions has means to stabilise the position of the cushions as a whole relative to the aircraft. This advantageously takes the form of an inflatable sponson associated with, or attached to, the supporting structure which, in an inflated condition, serves to rigidify the cushions relative to the aircraft.

The lowermost surface of the cushions, i.e. that which provides the landing surface for the equipment, must generally possess good wear resistance and an ability to deflect when in moving contact with the ground and objects thereon. Individual cushions, or alternatively the lowermost surface of the equipment generally, preferably has a protective skid which, in contact with the ground in use, provide a high degree of impact, cutting and abrasion resistance for its associated cushion or cushions which, in turn, provide the dynamic and thermal insulation for the aircraft's fuselage in particular.

Preferably the skids can be readily replaced after use. In addition, it is preferred to include a skid lubricating system, advantageously one which uses a wet foam with means to spray it into the landing surface of the equipment and onto the skid in particular when used. Such a system is of most use when take-off distance is restricted.

The landing equipment may be mounted onto the aircraft by a variety of methods. In general the support structure for the equipment would be attached to the aircraft fuselage by mechanical, adhesive or circumferential harness means, or combinations thereof. A mechanical attachment to existing main frames of the aircraft would be most suitable for dissipating loads into the aircraft structure.

When required, inflation of the equipment, i.e. the cushions and any inflatable part of the support structure, could be achieved in any suitable manner. However, it is preferred to employ induction of natural ram air during flight or gas cartridge driven impellers or a combination thereof; the latter is generally for use in emergency situations during landing and take-off. Alternatively a positive displacement blower unit may be employed. Any inflatable part of the support structure (or sub-frame) could be plugged into an integral air reticulation system rated to operate at a nominal pressure of, say, 34.5 kN/m$^2$ (5 lb/in$^2$). In the event of damage, each unit should have means automatically to isolate itself.

Deflation and restriction of the equipment is preferably achieved by induced suction acting on the same installed air reticulation system backed-up, for example, by the same blower in vacuum mode.

Figure 3:
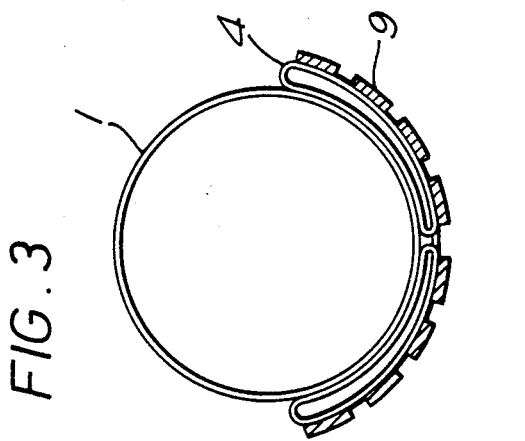
Figure 2:
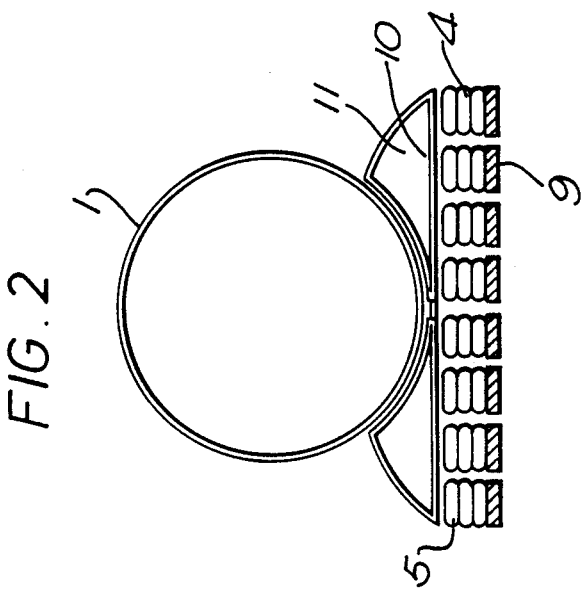
Figure 4:
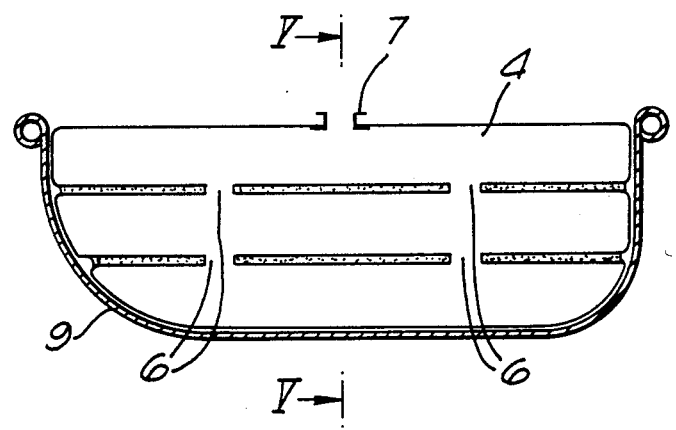
Figure 5:
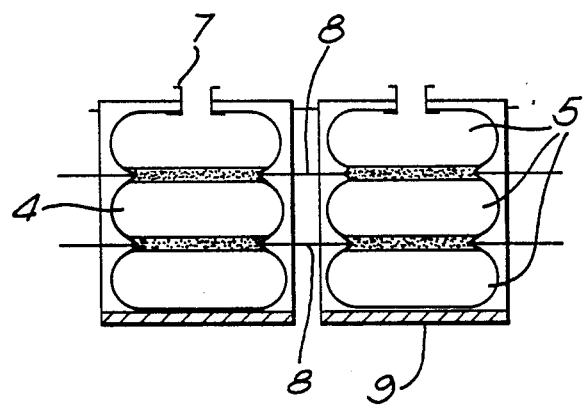

For a better understanding of the invention, reference will now be made for the purposes of exemplification only to the accompanying drawings in which:

FIG. 1 is a simplified side view of an aircraft whose fuselage is fitted with auxiliary landing equipment in accordance with the invention in an inflated state, FIG. 2 is a sectional view of the aircraft along the line II—II of FIG. 1 again with the auxiliary landing equipment in an inflated state, FIG. 3 is the same sectional view as shown in FIG. 2 but with the auxiliary landing equipment in a deflated and retracted state, FIG. 4 is an enlarged longitudinal sectional view of an individual cushion of the auxiliary landing equipment shown in FIG. 1, and FIG. 5 is an enlarged transverse sectional view of a pair of adjacent cushions along the line V—V of FIG. 4.

With reference to the drawings, FIG. 1 shows schematically an aircraft 1 fitted with auxiliary landing equipment of the invention. In the inflated state depicted in FIG. 1, the lowermost surfaces of the auxiliary equipment project beneath the maximum projection of the aircraft main landing gear indicated by the main wheels 2 and also by the nose wheel 3 along the line X—X.

The equipment shown comprises a plurality of cushions 4 arranged in a predetermined rectangular array, each cushion having three individual cushion "cells" 5 secured together and whose adjacent sides possess interconnecting air passageways 6 as shown in FIG. 4 in particular; and each cushion is connected to inflation means via passageway 7. Internal horizontal webs formed between the cells provide the necessary stability, particularly transverse stability, and regulate the geometric conformity of the cushion as a whole.

Each cushion is linked to its adjacent cushions by transverse textile membranes 8 to provide in use permanent lateral relative location.

The cushions are manufactured from neoprene reinforced with Nylon to provide a lightweight, robust and conformable object. The internal transverse membranes are of a similar material and the equipment is assembled using fully vulcanised joints.

Each cushion has a protective skid 9 to provide in use the total interface between the equipment and the ground. The skid has a slightly greater width than the cushion and is made from a flexible, inextensible, lightweight composite construction comprising Nomex for thermal and wear resistance, Kevlar for strength and also tear and cutting resistance and neoprene as a consolidating agent and providing non-flammable properties. As such, the skids provide both mechanical and thermal protection (for example up to 1100° C.) to the cushions. Each skid has a two point attachment system at the front and rear to enable ready replacement.

The cushions are mounted in a series of support structures in the form of flexible sub-frames 10 for fixing to a main support to be firmly attached to the aircraft by means of a circumferential harness or other mechanical means or by use of an adhesive. Any mechanical attachment is preferably effected to the existing aircraft main frames in order to dissipate the loads into the aircraft structure generally. Each sub-frame is designed to be readily handleable and the fixing method must be compatible with the environment in which the fixing would take place. Self locking textile methods are preferred.

The equipment includes an inflatable pneumatic sponson 11 (which can be inflated simultaneously with the cushions) and in the inflated state provides roll stability without the need to employ rigid struts (or whatever) attached to the aircraft fuselage. The sponson is shaped so that when inflated it forms a flat surface below the fuselage from which the cushions 4 are suspended. The sponson may possess transverse diaphragms at intervals along its length to ensure its shape is maintained.

As such, the equipment as a whole when deflated can be retracted as shown schematically in FIG. 3 to present a minimum drag profile to the aircraft during flight. In practice, the retraction would be greater than that shown in FIG. 3 and the drag profile thereby made even less.

Each cushion connects to the air reticulation system via a series of 76 mm diameter quick release spigots. The spigots incorporate an automatic closure mechanism actuated by a massive drop in back pressure occurring, for example, on cushion rupture.

With regard to inflation of the equipment, three distinct methods can be employed:

(a) Ram air effect utilising a duct projecting into airstream which, upon opening, allows very rapid, in flight, inflation of the full system.

(b) Positive displacement blower of either the Sliding Vane or "Roots" blower type. This provides for full inflation on the ground and will provide back up inflating air for air loss replacement when ram effect drops off upon actual touchdown, should this be required.

This blower will also double up as the vacuum pump (in conjunction possibly with an aerodynamic system) for system deflation (retraction). It is powered from the airplane electric or service air system, or has an independent power source.

(c) Two standby units in the form of emergency cartridge impellers can be fitted for use in the event of failure of either of the above systems or to back up these systems if some unexpected pressure loss occurs. They would also supply rapid inflation on the ground if circumstances so dictate.

Finally, the equipment provides a foam dispenser 12 at a point forward of the front cushions to provide a rapid release of lubricating foam for use on take-off, particularly in cases of restricted take-off distance.

I claim:

1. In combination with an aircraft with primary landing equipment comprising a plurality of wheels, auxiliary landing equipment comprising an inflatable support structure attachable to the aircraft, a plurality of inflatable cushions attached in a predetermined array to the support structure, inflation means for inflating the support structure and cushions to deploy the auxiliary landing equipment for landing, and deflating means for deflating the support structure and cushions for stowing the same, at least some of the cushions comprising a plurality of individual cushion cells interconnected by air passageways.

2. Structure as claimed in claim 1, in which a plurality of cushions are attached to the support structure so as to extend along the length of the aircraft in use.

3. Structure as claimed in claim 2, in which the support structure includes means for stabilizing the cushions relative to the aircraft.

4. Structure as claimed in claim 1, in which the cushion cells are arranged in a vertical tier with adjacent surfaces being bonded together to form internal webs.

5. Structure as claimed in claim 1, which includes means to hold the cushions in the predetermined array in the form of interconnecting membranes between at least some of the cushions.

6. In combination with an aircraft with primary landing equipment comprising a plurality of wheels, auxiliary landing equipment comprising an inflatable support structure attachable to the aircraft, a plurality of inflatable cushions attached in a predetermined array to the support structure, inflation means for inflating the support structure and cushions to deploy the auxiliary landing equipment for landing, deflating means for deflating the support structure and cushions for stowing the same, a skid attached to individual cushions or to the lowermost surface of the equipment, and means for lubricating said skid.

7. Structure as claimed in claim 6, in which the skid is replaceable.

* * * * *